United States Patent [19]

Kobayashi

[11] Patent Number: 5,581,008

[45] Date of Patent: Dec. 3, 1996

[54] BRANCHED ORGANOSILICON COMPOUNDS AND A METHOD FOR THEIR PREPARATION

[75] Inventor: Hideki Kobayashi, Chiba Prefecture, Japan

[73] Assignee: Dow Corning Toray Silicone Co., Ltd., Tokyo, Japan

[21] Appl. No.: 505,726

[22] Filed: Jul. 21, 1995

[30] Foreign Application Priority Data

Jul. 26, 1994 [JP] Japan .................................. 6-193689

[51] Int. Cl.$^6$ .................................................. C07F 7/08
[52] U.S. Cl. .............................. 556/434; 528/15; 528/24
[58] Field of Search .............................. 556/434; 528/15, 528/24

[56] References Cited

U.S. PATENT DOCUMENTS

| | | | |
|---|---|---|---|
| 5,041,591 | 8/1991 | Okawa | 556/434 |
| 5,272,243 | 12/1993 | Nakashima et al. | 528/15 X |
| 5,312,946 | 5/1994 | Stank et al. | 556/434 X |
| 5,442,083 | 8/1995 | Kobayashi | 556/434 |
| 5,484,868 | 1/1996 | Kobayashi | 528/15 |

*Primary Examiner*—Paul F. Shaver
*Attorney, Agent, or Firm*—Timothy J. Troy

[57] ABSTRACT

The present invention relates to branched silicon-bonded hydrogen endblocked organosilicon compounds containing silalkylene groups and to a method for the preparation of such compounds. The organosilicon compounds of this invention are soluble in certain organic solvents and can be prepared such that they have a very high weight average molecular weight.

22 Claims, No Drawings

BRANCHED ORGANOSILICON COMPOUNDS AND A METHOD FOR THEIR PREPARATION

BACKGROUND OF THE INVENTION

The present invention relates to novel organosilicon compounds and to a method for their preparation. Specifically, this invention relates to novel branched organosilicon compounds having silalkylenesiloxane units, and to a method for their preparation.

Organosilicon compounds having silalkylenesiloxane units of the formula:

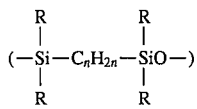

where R is a monovalent hydrocarbon group, and n is a positive integer have been disclosed and are known to be resistant to molecular chain scission by ionic substances such as acids or alkalis compared to other known diorganopolysiloxanes. Methods of making these organosilicon compounds having silalkylenesiloxane units by ring-opening polymerization of cyclic silalkylenesiloxanes have been proposed by Izvestiya Akademii Nauk SSSR, Seriya Khimicheskaya, No. 4, 739-744, April, 1971, and are disclosed in Japanese Patent Application Laid-Open No. 4-65428 (65,428/1992), and in Japanese Patent Application Laid-Open No. 4-65429 (65,429/1992).

However, in the methods described above, cyclic silalkylenesiloxanes such as 2,2,6,6-tetramethyl-1-oxa-2,6-disilacyclohexane are prepared in advance, and then subjected to ring-opening polymerization. Thus the polymer compounds obtained in the above methods are linear polymer compounds. There has been no disclosure of branched organosilicon compounds having silalkylenesiloxane units.

SUMMARY OF THE INVENTION

The present invention relates to branched organosilicon compounds having silalkylenesiloxane units, and to a method for their preparation.

It is an object of the present invention to produce silicon-bonded hydrogen endblocked branched organosilicon compounds and containing silalkylenesiloxane units.

It is a further object of this invention to introduce a method for the preparation of silicon-bonded hydrogen endblocked silalkylenesiloxane containing organopolysiloxanes.

It is another object of this invention to produce branched organosilicon compounds which are useful as defoaming additives in acid or alkali environments.

It is a further object of this invention to prepare branched organosilicon compounds which are useful as additives in silicone rubber compositions.

DETAILED DESCRIPTION OF THE INVENTION

The present invention relates to an organosilicon compound having its unit formula selected from:

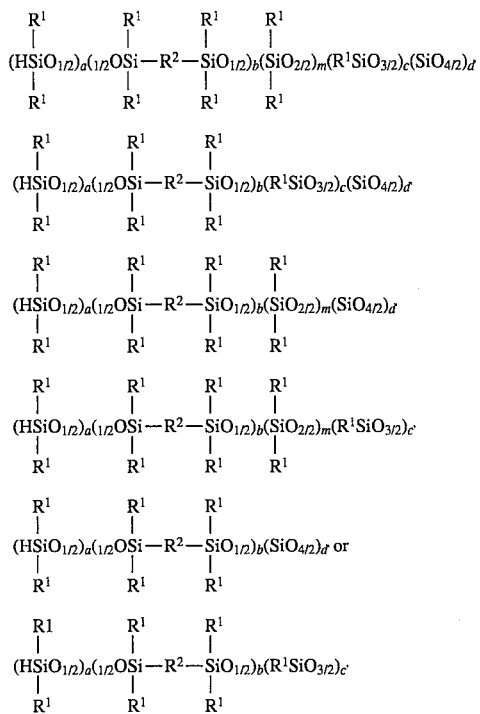

wherein $R^1$ is a monovalent hydrocarbon group having from 1 to 10 carbon atoms and free of aliphatic unsaturation, $R^2$ is an alkylene group having from 2 to 10 carbon atoms, m has value of greater than zero, a has a value of greater than zero, b has a value of greater than zero, c has value of greater than zero, and d has value of greater than zero.

In the formula above, $R^1$ is a monovalent hydrocarbon group having from 1 to 10 carbon atoms and free of aliphatic unsaturation and is specifically exemplified by alkyl groups such as methyl, ethyl, propyl, butyl, pentyl, hexyl, heptyl, octyl, nonyl, or decyl, fluorine-containing organic groups such as 3,3,3-trifluoropropyl, or 3,3,4,4,5,5,6,6,6-nonafluorohexyl, aryl groups such as phenyl, tolyl, or xylyl, or aralkyl groups such as benzyl or phenethyl, and preferably selected from methyl or phenyl.

In the formula above, $R^2$ is an alkylene group having from 2 to 10 carbon atoms and may be straight chain or a branched alkylene group, and is specifically exemplified by ethylene, methylethylene, ethylethylene, propylethylene, butylethylene, propylene, butylene, 1-methylpropylene, pentylene, hexenylene, heptenylene, octenylene, nonenylene, or decenylene, and is preferably selected from ethylene, propylene, butylene, or hexenylene.

In the organosilicon compounds of the present invention, the number of silicon atoms in the polydiorganosiloxane units of the above formula is preferably less than 50% of the total number of silicon atoms in the branched organosilicon compounds of this invention.

In the organosilicon compounds of this invention, the $(HR^1{}_2SiO_{1/2})$ unit is the endblocking group, and the $(O_{1/2}R^1{}_2SiR^2R^1{}_2SiO_{1/2})$ unit is a unit comprising the principal $R^1$chain of the compound. Also, the $(R^1SiO_{3/2})$ unit and the $(SiO_{4/2})$ unit are units which cause branching of the compound, and at least one of these units must be present in the organosilicon compounds of this invention.

The average molecular weight of the compounds of this invention can be easily measured by gel permeation chromatography (GPC). The organosilicon compounds of this invention preferably have a weight average molecular weight of 1,000 or higher.

The organosilicon compounds of this invention are branched organosilicon compounds which are soluble in selected organic solvents, for example, aromatic hydrocarbon solvents such as toluene or xylene, aliphatic hydrocarbon solvents such as hexane, heptane, octane, or nonane, alicyclic hydrocarbon solvents such as cyclohexane, cycloheptane, or cyclooctane, and fluorine atom-containing aromatic hydrocarbon solvents such as trifluoromethylbenzene, 1,3-bis(trifluoromethyl)benzene, or methylpentafluorobenzene. In many cases, it is not soluble in methanol.

The ratio of a to d and m in the organosilicon compounds of this invention determines their solubility in selected organic solvents. The solubility and characteristics of the compounds of this invention are also determined by the type of $R^1$, $R^2$, and $R^3$ (described hereinbelow) groups selected Preferably, the ratio of a/b is 3 or less and the ratio of (c+d)/b is 1 or less.

Specific examples of organosilicon compounds of the present invention are compounds having their formula selected from the group consisting of

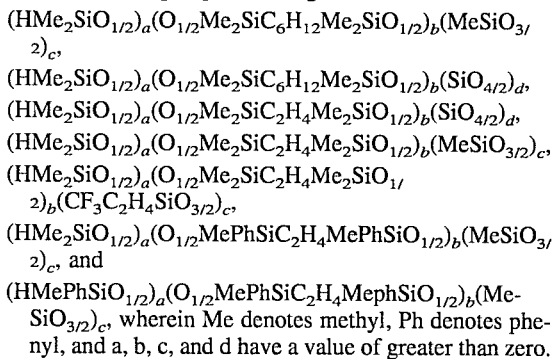

wherein Me denotes methyl, Ph denotes phenyl, and a, b, c, and d have a value of greater than zero.

The organosilicon compounds of this invention may contain the bifunctional siloxane unit having the formula $(R^1_2SiO_{2/2})$ wherein $R^1$ is as defined above, in addition to the $(HR^1_2SiO_{1/2})$ unit $(O_{1/2}R^1_2SiR^3R^1_2SiO_{1/2})$ unit, $(R^1SiO_{3/2})$ unit, and $(SiO_{4/2})$ unit described hereinabove.

The present invention further relates to a method of making branched organosilicon compounds, the method comprising (I) reacting: (A) a siloxane selected from (i) a tetrasiloxane having the formula $R^1Si(OR^1_2SiH)_3$; (ii) a pentasiloxane having the formula $Si(OR^1_2SiH)_4$, or (iii)mixtures of (i) and (ii) wherein $R^1$ is a monovalent hydrocarbon group having from 1 to 10 carbon atoms and free of aliphatic unsaturation; and (B) a compound selected from the group consisting of (i) a diorganosiloxane having its formula selected from $R^3R^1_2SiO(R^1_2SiO)_pSiR^1_2R^3$ or $R^3R^1_2SiOSiR^1_2R^3$ wherein $R^1$ is as defined above, $R^3$ is an alkenyl group having from 2 to 10 carbon atoms, and p is an integer having a value of greater than zero; (ii) an unsaturated aliphatic hydrocarbon compound having from 3 to 10 carbon atoms and having at least 2 carbon-carbon double bonds; and (iii) an unsaturated aliphatic hydrocarbon compound having from 3 to 10 carbon atoms and having at least one carbon-carbon triple bond; in the presence of (C) a catalyst. The reaction mixture of (I) can further comprise (D) a diorganopolysiloxane having its formula selected from $HR^1_2SiO(R^1_2SiO)_pSiR^1_2H$  $HR^1_2SiOSiR^1_2H$ wherein $R^1$ and p are as defined above.

In the method of the present invention, the tetrasiloxanes and/or pentasiloxanes of (A) are the raw materials which supply branching to the organosilicon compounds of this invention. In the formula above, $R^1$ is as defined above including preferred embodiments thereof. Preferably R1 is selected from methyl or phenyl.

Although these siloxanes constitute the branched part of the organosilicon compounds of the present invention, they partially can constitute a part of the principal chain or can be an endblocking group. In the method of this invention, the tetrasiloxanes and pentasiloxanes can be used individually, or a mixture of the two can be used.

The tetrasiloxane of (A) is preferably selected from $MeSi(OMe_2SiH)_3$, $MeSi(OMeEtSiH)_3$, $PhSi(OMe_2SiH)_3$, or $CF_3C_2H_4Si(OMe_2SiH)_3$, where Me denotes methyl, Et denotes ethyl, and Ph denotes phenyl group. The pentasiloxane of (A) is preferably selected from $Si(OMe_2SiH)_4$ or $Si(OMeEtSiH)_4$ wherein Me denotes methyl, and Et denotes ethyl.

Component (B) in the method of this invention comprises a part of the principal chain of the organosilicon compound of the present invention. The alkenyl groups of $R^3$ are preferably selected from vinyl, allyl, butenyl, pentenyl, hexenyl, or octenyl.

The diorganosiloxane of (i) is preferably selected from
$CH_2=CHMe_2SiOMe_2SiCH=CH_2$,
$CH_2=CHCH_2Me_2SiOMe_2SiCH_2CH=CH_2$,
$CH_2=CH (CH_2)_4Me_2SiOMe_2Si(CH_2)_4CH=CH_2$,
$CH_2=CH (C_2H_5)_2SiO(C_2H_5)_2SiCH=CH_2$,
$CH_2=CHCH_2MePhSiOMePhSiCH_2CH=CH_2$,
$CH_2=CHMe_2SiO (Me_2SiO)_2Me_2SiCH=CH_2$,
$CH_2=CHCH_2Me_2SiO (Me_2SiO)_2Me_2SiCH_2CH=CH_2$,
or
$CH_2=CH\quad(CH_2)_4Me_2SiO(Me_2SiO)_2Me_2Si(CH_2)_4CH=CH_2$ wherein Me denotes methyl, and Ph denotes phenyl.

The unsaturated aliphatic hydrocarbon compounds of (ii) or (iii) are the components which introduce alkylene groups into the organosilicon compounds of this invention. The unsaturated aliphatic hydrocarbon compounds of (ii) can be selected from 1,2-propadiene (allene), 1,2,-butadiene, 2-methyl-1,3-butadiene (isoprene), 2,3-dimethyl-1,3-butadiene, 1,3-pentadiene, 1,4-pentadiene, 1,5-hexadiene, or 1,3-cyclohexadiene.

The unsaturated aliphatic hydrocarbon compounds of (iii) can be selected from acetylene, propyne, 1-butyne, 2-butyne, 1-pentyne, 2-pentyne, 3-methyl-1-butyne, 3,3-dimethyl-1-butyne, 1-hexyne, 2-hexyne, 1-heptyne, 1-octyne, 4-octyne, 1-nonyne, 1-decyne, or 5-decyne.

The amount of component (B) is appropriately adjusted in order to obtain an organosilicon compound having a desired molecular weight and amount of branching. Preferably, (B) is added such that the ratio of the number of moles of alkenyl groups in (B) to the number of moles of silicon-bonded hydrogen atoms in (A) is from about ½ to ⅕.₅.

Component (C), the catalyst, is a catalyst which promotes an addition reaction between silicon-bonded hydrogen atoms of (A) and the alkenyl groups of (B). For example, (C) can be selected from platinum catalysts, rhodium catalysts, palladium catalysts, or organic peroxides. Platinum catalysts are preferred since they more easily promote addition polymerization. Preferred platinum catalysts include platinum black, silica fine powder-supported platinum, carbon powder-supported platinum, chloroplatinic acid, alcohol solution of chloroplatinic acid, a complex of platinum and vinylsiloxane, or a complex of platinum and olefin.

The amount of (C) is not particularly limited, however it is preferred that (C) is added in a range of from 0.1 to 500 parts by weight per one million parts by weight of the total weight of the reactants employed in the method of this invention.

The reaction mixture of (I) can further comprise (D) a diorganopolysiloxane. Component (D) can comprise a part of the principal chain of the organosilicon compounds of this invention. The diorganopolysiloxane of (D) can be selected from HMe$_2$SiOMe$_2$SiH, HMeC$_2$HSSiOC$_2$HSMeSiH, H(C$_2$H$_5$)$_2$SiO(C$_2$H$_5$)$_2$SiH, HMePhSiOMePhSiH, HMe$_2$SiO(Me$_2$SiO)$_2$Me$_2$SiH, HMe$_2$SiO(MePhSiO)$_2$Me$_2$SiH, or HMePhSiO(Me$_2$SiO)$_2$MephSiH wherein Me denotes methyl, and Ph denotes phenyl.

In the method of the present invention, the order of addition of components (A) to (C) and optionally (D) is arbitrary, and can be readily determined by those skilled in the art through routine experimentation. For example, one method comprises mixing components (A), (B), and optionally (D), heating and stirring this mixture, then adding component (C) gradually to this mixture. Another method comprises mixing components (A) and (C), heating and stirring this mixture, next adding (B) gradually to this mixture. Another method comprises mixing (A) and (D), heating and stirring this mixture, next adding (B), and then finally adding (C) gradually to the resulting mixture.

In the method of this invention, an organic solvent can be used as long as the objective of the present invention is not impaired. Organosilicon compounds of higher molecular weight can be manufactured by the use of organic solvents in the method of this invention. The organic solvent can be, for example, aromatic hydrocarbon compounds such as toluene or xylene, aliphatic hydrocarbon compounds such as hexane, heptane, octane, or nonane, alicyclic hydrocarbon compounds such as cyclohexane, cycloheptane, or cyclooctane, or fluorine atom-containing aromatic hydrocarbon compounds such as trifluoromethylbenzene, 1,3 -bis(trifluoromethyl) benzene, or methylpentafluorobenzene.

The reaction conditions for the method of this invention is not particularly limited. If the reaction is carried out at ambient atmosphere, its reaction temperature is limited by the boiling points of components (A)–(C) and optionally (D) or the boiling point of the organic solvent (if used) and also. If the boiling points of components (A)–(C), and optionally (D), and the organic solvent (if used) are relatively low, the reaction may be carried out under pressure.

In the method of this invention, silicon-bonded hydrogen endblocked organosilicon compounds can be obtained by mixing the above components such that the number of moles of silicon-bonded hydrogen atoms in (A) is larger than the number of moles of alkenyl groups in (B).

The branched organosilicon compounds of this invention are soluble in certain organic solvents, and preferably has a weight average molecular weight of 1,000 or larger. This substance usually ranges in form from a viscous liquid to a gum at room temperature.

The branched organosilicon compounds of this invention are resistant to molecular chain scission by ionic substances such as acids or alkali. The compounds of this invention are useful as defoaming additives in such environments. Also, the compounds of the invention can be utilized as an additive for organic peroxide-curing silicone rubber compositions, addition reaction-curing silicone rubber compositions, or condensation reaction-curing silicone rubber compositions.

Furthermore, the silicon-bonded hydrogen endblocked organosilicon compounds of the present invention can be used as starting materials for preparing organosilicon compounds which are endblocked by organofunctional groups by an addition reaction with a hydrogensilane which contains organofunctional groups. The organosilicon compounds of this invention can also be used as the starting material for preparing novel composite materials of organic resin and organosilicon compounds by an addition reaction with organic resins having carbon-carbon double bond residue.

In the Examples hereinbelow, the viscosity is the value measured at 25° C. and Me denotes methyl.

EXAMPLE 1

About 60 grams (g) of toluene, 53.6 g (0.2 mole) of methyltris (dimethylsiloxy) silane (MeSi (OSiMe$_2$H)$_3$), and 0.5 g of 0.5% carbon powder-supported platinum were loaded in a reaction vessel, and heated to 60° C. while being stirred slowly. Next, a mixture of 16.56 g (0.202 mole) of 1,5-hexadiene and 20 g of toluene was added into the reaction vessel. After the addition was complete, the resulting mixture was heated and refluxed for 2 hours. Subsequently, after the reaction product was cooled and filtered, the solvent was removed by distillation, and a viscous liquid was obtained. The yield of this viscous liquid was 97%. This viscous liquid was analyzed by $^{29}$Si, $^{13}$C nuclear magnetic resonance spectral analysis (hereinafter NMR), and Fourier transform infrared absorption spectra (hereinafter FT-IR). From the above results, it was confirmed that this viscous liquid was an organosilicon compound having the average unit formula:

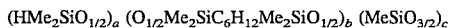

(HMe$_2$SiO$_{1/2}$)$_a$ (O$_{1/2}$Me$_2$SiC$_6$H$_{12}$Me$_2$SiO$_{1/2}$)$_b$ (MeSiO$_{3/2}$)$_c$ wherein the ratio of a/b/c was 1/1/1.

By the analysis of this organosilicon compound by gel permeation chromatography (hereinafter GPC), it was found that its weight average molecular weight was 6,600 calibrated by polydimethylsiloxane, and the yield of the organosilicon compound obtained from the peak area was 96%. Also, this substance was soluble in toluene and xylene.

EXAMPLE 2

About 60 g of toluene, 53.6 g ( 0.2 mole) of methyltris (dimethylsiloxy)silane [MeSi (OSiMe$_2$H)$_3$], and 0.5 g of 0.5% carbon powder-supported platinum were loaded in a reaction vessel, and heated to 95° C. while being stirred slowly. Next, a mixture of 39 g (0.21 mole) of 1,3-divinyltetramethyldisiloxane and 10 g of toluene was added to the reaction vessel. After the addition was complete, the resulting mixture was heated and refluxed for 2 hours. Subsequently, after the reaction product was cooled and filtered, the solvent was removed by distillation, and a viscous liquid was obtained. The yield of this viscous liquid was 99%. This viscous liquid was analyzed by $^{29}$Si, $^{13}$C NMR, and FT-IR. From the above results, it was confirmed that this viscous liquid was an organosilicon compound having the average unit formula:

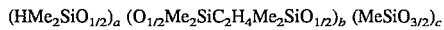

(HMe$_2$SiO$_{1/2}$)$_a$ (O$_{1/2}$Me$_2$SiC$_2$H$_4$Me$_2$SiO$_{1/2}$)$_b$ (MeSiO$_{3/2}$)$_c$ wherein the ratio of a/b/c was 1/2.3/1.

By the analysis of this organosilicon compound by GPC it was found that its weight average molecular weight was 16,000 calibrated by polydimethylsiloxane, and the yield of the organosilicon compound obtained from the peak area was 90%. Also, this substance was soluble in toluene and xylene.

EXAMPLE 3

About 60 g of toluene, 49.2 g (0.15 mole) of tetrakis (dimethylsiloxy) silane, and 0.6 g of 0.5% carbon powder-supported platinum were loaded in a reaction vessel, and heated to 70° C. while being stirred slowly. Next, a mixture of 28.4 g (0.153 mole) of 1,3-divinyltetramethyldisiloxane and 20 g of toluene was added to the reaction vessel. After the addition was complete, the resulting mixture was refluxed by heating for 3 hours. Subsequently, after the reaction product was cooled and filtered, the solvent was removed by distillation, and a viscous liquid was obtained. The yield of this viscous liquid was 98%. This viscous liquid was analyzed by $^{29}Si$, $^{13}C$ NMR, and FT-IR. From the above results, it was confirmed that this viscous liquid was an organosilicon compound having the average unit formula:

$$(HMe_2SiO_{1/2})_a (O_{1/2}Me_2SiC_2H_4Me_2SiO_{1/2})_b (SiO_{4/2})_d$$

wherein the ratio of a/b/d was 1.9/2/1.

By the analysis of this organosilicon compound by GPC, it was found that its weight average molecular weight was 8,000 calibrated by polydimethylsiloxane, and the yield of the organosilicon compound obtained from the peak area was 90%. Also, this substance was soluble in toluene and xylene.

That which is claimed is:

1. An organosilicon compound having its unit formula selected from:

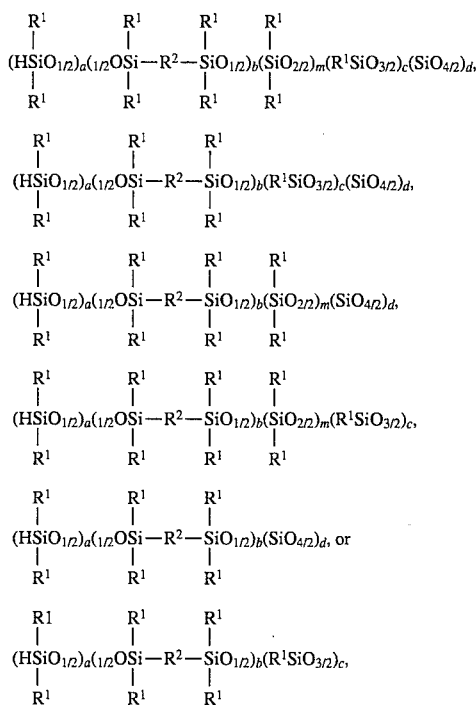

wherein $R^1$ is a monovalent hydrocarbon group having from 1 to 10 carbon atoms and free of aliphatic unsaturation, $R^2$ is an alkylene group having from 2 to 10 carbon atoms, m has value of greater than zero, a has a value of greater than zero, b has a value of greater than zero, c has value of greater than zero, and d has a value of greater than zero.

2. A compound according to claim 1, wherein $R^1$ is selected from methyl, ethyl, propyl, butyl, pentyl, hexyl, heptyl, octyl, nonyl, decyl, 3,3,3-trifluoropropyl, 3,3,4,4,5,5,6,6,6-nonafluorohexyl, phenyl, tolyl, xylyl, benzyl or phenethyl.

3. A compound according to claim 2, wherein $R^1$ is selected from methyl or phenyl.

4. A compound according to claim 1, wherein $R^2$ is selected from ethylene, methylethylene, ethylethylene, propylethylene, butylethylene, propylene, butylene, 1-methylpropylene, pentylene, hexenylene, heptenylene, octenylene, nonenylene, or decenylene.

5. A compound according to claim 4, wherein R2 is selected from ethylene, propylene, butylene, or hexenylene.

6. A compound according to claim 1, wherein the organosilicon compound is selected from a compound having its unit formula selected from the group consisting of:

$(HMe_2SiO_{1/2})_a (O_{1/2}Me_2SiC_6H_{12}Me_2SiO_{1/2})_b (MeSiO_{3/2})_c$, $(HMe_2SiO_{1/2})_a (O_{1/2}Me_2SiC_6H_{12}Me_2SiO_{1/2})_b (SiO_{4/2})_d$, $(HMe_2SiO_{1/2})_a (O_{1/2}Me_2SiC_2H_4Me_2SiO_{1/2})_b (SiO_{4/2})_d$, $(HMe_2SiO_{1/2})_a (O_{1/2}Me_2SiO_{1/2})_b (MeSiO_{3/2})_c$, $(HMe_2SiO_{1/2})_a (O_{1/2}Me_2SiC_2H_4Me_2SiO_{1/2})_b (CF_3C_2H_4SiO_{3/2})_c$, $(HMe_2SiO_{1/2})_a (O_{1/2}MePhSiC_2H_4MePhSiO_{1/2})_b (MeSiO_{3/2})_c$, and $(HMePhSiO_{1/2})_a (O_{1/2}MePhSiO_{1/2})_b (MeSiO_{3/2})_c$, wherein Me denotes methyl, Ph denotes phenyl, and a, b, c, and d have a value of greater than zero.

7. A method of making branched organosilicon compounds, the method comprising:

(I) reacting:

(A) a siloxane selected from (i) a tetrasiloxane having the formula $R^1Si(OR^1{}_2SiH)_3$, (ii) a pentasiloxane having the formula $Si(OR^1{}_2SiH)_4$, or (iii) mixtures of (i) and (ii)

wherein $R^1$ is a monovalent hydrocarbon group having from 1 to 10 carbon atoms and free of aliphatic unsaturation; and (B) a compound selected from the group consisting of (i) a diorganosiloxane having its formula selected from $R3R^1{}_2SiO(R^1{}_2SiO)_pSiR^1{}_2R^3$ or $R^3R^1{}_2SiOSiR^1{}_2R^3$ wherein $R^1$ is as defined above, $R^3$ is an alkenyl group having from 2 to carbon atoms, and p is an integer having a value of greater than zero, (ii) an unsaturated aliphatic hydrocarbon compound having from 3 to 10 carbon atoms and having at least 2 carbon-carbon double bonds, and (iii) an unsaturated aliphatic hydrocarbon compound having from 3 to 10 carbon atoms and having at least one carbon-carbon triple bond; in the presence of (C) a catalyst.

8. A method according to claim 7, wherein the reaction mixture of (I) further comprises (D) a diorganopolysiloxane having its formula selected from $HR^1{}_2SiO(R^1{}_2SiO)_pSiR^1{}_2H$ or $HR^1{}_2SiOSiR^1{}_2H$ wherein $R^1$ and p are as defined above.

9. A method according to claim 7, wherein $R^1$ is selected from methyl or phenyl.

10. A method according to claim 7, wherein (A) is selected from $MeSi(OMe_2SiH)_3$, $MeSi(OMeEtSiH)_3$, $PhSi(OMe_2SiH)_3$, or $CF_3C_2H_4Si(OMe_2SiH)_3$, where Me denotes methyl, Et denotes ethyl, and Ph denotes phenyl group.

11. A method according to claim 7, wherein (A) is selected from $Si(OMe_2SiH)_4$ or $Si(OMeEtSiH)_4$ wherein Me denotes methyl, and Et denotes ethyl.

12. A method according to claim 7, wherein $R^3$ is selected from vinyl, allyl, butenyl, pentenyl, hexenyl, or octenyl.

13. A method according to claim 7, wherein (B) is selected from $CH_2=CHMe_2SiOMe_2SiCH=CH_2$, $CH_2=CHCH_2Me_2SiOMe_2SiCH_2CH=CH_2$, $CH_2=CH(CH_2)_4Me_2SiOMe_2Si(CH_2)_4CH=CH_2$, $CH_2=CH(C_2H_5)_2SiO(C_2H_5)_2SiCH=CH_2$, $CH_2=CHCH_2MePhSiOMePhSiCH_2CH=CH_2$, $CH_2=CHMe_2SiO(Me_2SiO)_2Me_2SiCH=CH_2$, $CH_2=CHCH_2Me_2SiO(Me_2SiO)_2Me_2SiCH_2CH=CH_2$, or $CH_2=CH(CH_2)_4Me_2SiO(Me_2SiO)_2Me_2Si(CH_2)_4CH=CH_2$ wherein Me denote methyl, and Ph denotes phenyl.

14. A method according to claim 7, wherein (B) is selected from 1,2-propadiene, 1,2,-butadiene, 2-methyl-1,3-butadiene, 2,3-dimethyl-1,3-butadiene, 1,3-pentadiene, 1,4-pentadiene, 1,5-hexadiene, or 1,3-cyclohexadiene.

15. A method according to claim 7, wherein (B) is selected from acetylene, propyne, 1-butyne, 2-butyne, 1-pentyne, 2-pentyne, 3-methyl-1-butyne, 3,3-dimethyl-1-butyne, 1-hexyne, 2-hexyne, 1-heptyne, 1-octyne, 4-octyne, 1-nonyne, 1-decyne, or 5-decyne.

16. A method according to claim 7, wherein (C) is selected from platinum catalysts, rhodium catalysts, palladium catalysts, or organic peroxides.

17. A method according to claim 16, wherein the platinum catalyst is selected from platinum black, silica fine powder-supported platinum, carbon powder-supported platinum, chloroplatinic acid, alcohol solution of chloroplatinic acid, a complex of platinum and vinylsiloxane, or a complex of platinum and olefin.

18. A method according to claim 8, wherein (D) is selected from $HMe_2SiOMe_2SiH$, $HMeC_2H_5SiOC_2H_5MeSiH$, $H(C_2H_5)_2SiO(C_2H_5)_2SiH$, $HMePhSiOMePhSiH$, $HMe_2SiO(Me_2SiO)_2Me_2SiH$, $HMe_2SiO(MePhSiO)_2Me_2SiH$, or $HMePhSiO(Me_2SiO)_2MePhSiH$ wherein Me denotes methyl, and Ph denotes phenyl.

19. A method according to claim 7, wherein the reaction mixture of (I) further comprises an organic solvent.

20. A method according to claim 19, wherein the organic solvent is selected from toluene, xylene, hexane, heptane, octane, nonane, cyclohexane, cycloheptane, cyclooctane, trifluoromethylbenzene, 1,3-bis(trifluoromethyl)benzene, or methylpentafluorobenzene.

21. A method according to claim 8, wherein the reaction mixture of (I) further comprises an organic solvent.

22. A method according to claim 21, wherein the organic solvent is selected from toluene, xylene, hexane, heptane, octane, nonane, cyclohexane, cycloheptane, cyclooctane, trifluoromethylbenzene, 1,3-bis(trifluoromethyl)benzene, or methylpentafluorobenzene.

* * * * *